United States Patent
Takasan et al.

(10) Patent No.: US 6,802,220 B2
(45) Date of Patent: Oct. 12, 2004

(54) APPARATUS FOR TRANSPORTING LEVITATED OBJECTS

(75) Inventors: Masaki Takasan, Kariya (JP); Yoshikazu Koike, Yokohama (JP); Sadayuki Ueha, Machida (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/028,096

(22) Filed: Oct. 25, 2001

(65) Prior Publication Data
US 2002/0088280 A1 Jul. 11, 2002

(30) Foreign Application Priority Data

Oct. 26, 2000 (JP) ........................................ 2000-326802
Oct. 26, 2000 (JP) ........................................ 2000-326803

(51) Int. Cl.$^7$ ............................................ B65G 27/00
(52) U.S. Cl. .................... 73/570.5; 198/630; 198/752.1
(58) Field of Search .......................... 73/570.5; 198/630, 198/752.1; 414/676

(56) References Cited

U.S. PATENT DOCUMENTS 4,284,403 A * 8/1981 Rey ........................... 73/570.5
5,810,155 A * 9/1998 Hashimoto et al. ......... 198/630

FOREIGN PATENT DOCUMENTS

| EP | 64593 A1 | * 11/1982 |
|----|----------|-----------|
| JP | 5-146178 | 6/1993 |
| JP | 7-24415  | 1/1995 |
| JP | 7-137824 | 5/1995 |
| JP | 9-202425 | 8/1997 |

OTHER PUBLICATIONS

Hahimoto et al., "Transporting objects without contact using flexural traveling waves," J. Acoust. Soc. Am. 103 (6), Jun. 1998, pp. 3230–3233.*

* cited by examiner

Primary Examiner—John E. Chapman
(74) Attorney, Agent, or Firm—Morgan & Finnegan, LLP

(57) ABSTRACT

An apparatus levitates and transports an object. The apparatus levitates the object above the surfaces of a plurality of vibrators by air pressure of sound waves that are generated by the vibrators. The apparatus has a plurality of vibration devices, each of which corresponds to one of the vibrators. Each vibration device includes a first transducer for vibrating the corresponding vibrator. Each transducer includes a super-magnetostrictive material. A common power source is connected to at least two of the first transducers for actuating the first transducers.

14 Claims, 5 Drawing Sheets

APPARATUS FOR TRANSPORTING LEVITATED OBJECTS

BACKGROUND OF THE INVENTION

The present invention relates to an apparatus for levitating an object by radiation pressure, such as sound waves, and to an apparatus for transporting a levitated object.

Japanese Unexamined Patent Publication No. 7-24415 discloses an apparatus for levitating an object. The apparatus includes a vibration device and a plate-like vibrator. The vibration device vibrates the vibrator to generate air pressure, which levitates an object. The surface of the levitated object that faces the vibrator is formed flat. The publication also discloses a transporting apparatus that moves levitated objects by blasting air or by producing traveling waves with the vibrator.

Japanese Unexamined Patent Publications No. 7-137824 and No. 9-202425 each disclose an apparatus for transporting a levitated object. Both apparatuses include parallel elongated plate-like vibrators. Each vibrator is vibrated by a transducer located in a corresponding vibration device. Each vibration device causes the corresponding transducer to generate traveling waves. Vibration of the vibrators generates air pressure and levitates a flat object. In this state, the object is transported. Also, a method for transporting a levitated object in which the above described levitating apparatus is mounted on a carriage is known in the art.

Japanese Unexamined Patent Publication No. 9-202425 discloses an apparatus in which transducers of all the vibration devices are connected to a common oscillator. The transducers are Langevin transducers that use piezoelectric elements. The transducers are vibrated at a resonance frequency, which vibrates vibrators at a required strength (amplitude).

A structure that has parallel vibrators needs several vibration devices and thus needs several transducers. To stably levitate an object, the vibrators must be synchronously vibrated at the same amplitude. Thus, in the apparatus of the publication No. 9-202425, the transducers of all the vibration devices are connected to the common oscillator. The oscillator sends excitation signals of the same amplitude and the same frequency to all the transducers.

However, due to errors produced when machining and assembling, it is difficult to manufacture identical vibration devices when the devices have transducers using piezoelectric elements. Therefore, the resonance frequency slightly differs from one vibration device to another. Therefore, although the transducers are connected to the common oscillator, an object cannot be stably levitated.

Japanese Unexamined Patent No. 5-146178 discloses an apparatus that includes a vibration motor. The motor has a first piezoelectric element and a second piezoelectric element, which are located on the stator. The first element excites a transducer, and the second element generates voltage in accordance with applied vibration. The second element is connected to an impedance element. The impedance of an electric circuit that includes the second piezoelectric element is changed by the impedance element. The resonance frequency of bending vibration is changed, accordingly.

In a vibration device that includes transducers having piezoelectric elements to excite vibrators, there are errors produced when machining and assembling parts. Therefore, horns that couple the transducers to the vibrators must be ground such that the resonance frequency of the device matches a desired value. Adjusting the frequencies takes long time when assembling the device and thus increases the cost. Also, the resonance frequency varies according to the load (an object to be transported) and the temperature. Therefore, even if the resonance frequency is adjusted to a desired value when assembling, the resonance frequency may be deviated from the desired value. If the apparatus has two or more parallel vibrators, the resonance frequency can be deviated from the first value by a relatively great amount.

SUMMARY OF THE INVENTION

Accordingly, it is an objective of the present invention to provide a transporting apparatus that stably levitates an object when the object is levitated by two or more vibration devices. Another objective of the present invention is to provide a transporting apparatus that stably transfers levitated objects.

To achieve the foregoing and other objectives and in accordance with the purpose of the present invention, an apparatus for levitating and transporting an object is provided. The apparatus levitates the object above the surfaces of a plurality of vibrators by air pressure of sound waves that are generated by the vibrators. The apparatus includes vibration devices and a common power source. Each of the vibration devices corresponds to one of the vibrators. Each vibration device includes a first transducer for vibrating the corresponding vibrator. Each transducer includes a supermagnetostrictive material. The common power source is connected to at least two of the first transducers for actuating the first transducers.

The present invention also provides another apparatus for levitating and transporting an object. The apparatus levitates an object above the surface of an elongated vibrator by air pressure of sound waves that are generated by the vibrator. The vibrator produces traveling waves. The apparatus includes a first transducer coupled to one end of the vibrator. The first transducer includes a piezoelectric element, which converts mechanical energy into electric energy. A transducer vibrates the vibrator. A second transducer coupled to the other end of the vibrator. The second transducer includes a changing element, which changes output voltage or output current for converting mechanical energy into electric energy. An external impedance element is connected to the piezoelectric element. The impedance of the external impedance element is variable. An oscillator is connected to the first transducer for vibrating the first transducer. A detector detects the vibration state of the second transducer. A controller controls at least one of the oscillator and the external impedance element based on the vibration state of the second transducer detected by the detector such that the output voltage or the output current of the changing element is greater than a predetermined value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A transporting apparatus 1 according to a first embodiment of the present invention will now be described with reference to FIGS. 1 and 2. The transporting apparatus 1 levitates and transports an object.

Figure 1:
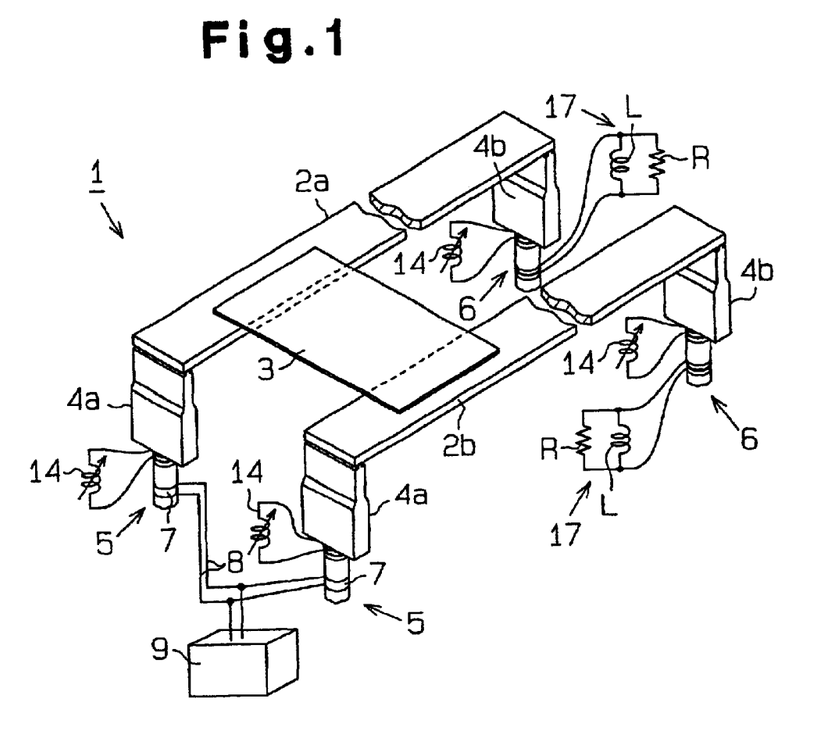
FIG. 1 is perspective view illustrating a transporting apparatus according to a first embodiment of the present invention.

As shown in FIG. 1, the transporting apparatus 1 includes parallel elongated vibrators 2a, 2b. The vibrators 2a, 2b have the same rectangular shape. The vibrators 2a, 2b levitate an object 3. The apparatus 1 includes first horns 4a and second horns 4b. Each first horn 4a is fixed to an end of one of the vibrators 2a, 2b by a bolt (not shown). Each second horn 4b is fixed to the opposite end of one of the vibrators 2a, 2b. The horns 4a, 4b are arranged perpendicular to the longitudinal direction of the vibrators 2a, 2b. The horns 4a, 4b are shaped as flattened rectangular parallelepipeds.

The apparatus 1 includes first transducers 5 and second transducers 6. The first transducers 5 are coupled to the first horns 4a, respectively, at the side opposite from the side fixed to the vibrators 2a, 2b. The second transducers 6 are coupled to the second horns 4b, respectively, at the side opposite from the side fixed to the vibrators 2a, 2b. Each first horn 4a and the corresponding second horn 4b, and the corresponding first and second transducers 5, 6 form a vibration device. The distal face of each of the horns 4a, 4b is perpendicular to the axial direction of the corresponding one of the first and second transducers 5, 6. The axes of the horns 4a, 4b and the axes of the transducers 5, 6 extend vertically. The transducers 5, 6 are fixed to a base plate (not shown) through brackets (not shown).

Figure 2A:
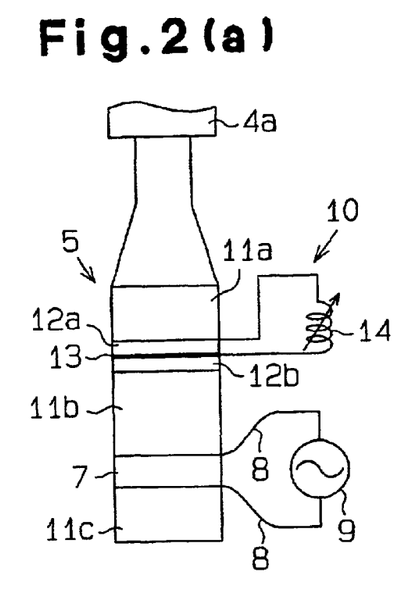
FIG. 2(a) is a front view illustrating a first transducer of the apparatus shown in FIG. 1.

As shown in FIG. 2(a), each first transducer 5 includes a magnetostrictive element 7, which is formed with super-magnetostrictive material. Each magnetostrictive element 7 includes a coil (not shown). The coils are connected to a common power source, which is an alternating-current power supply 9 in this embodiment, by wires 8. The power supply 9 is an oscillator and sends excitation signals of predetermined amplitude and a predetermined frequency to the magnetostrictive elements 7. Each first transducer 5 includes an adjuster 10 for adjusting the resonance frequency of the corresponding vibration device. Each magnetostrictive element 7 and the corresponding adjuster 10 are held among metal blocks 11a, 11b, 11c by a bolt. The bolt is inserted through a hole formed in the metal block 11c and is screwed to a threaded hole formed in the metal block 11a.

Each adjuster 10 includes a pair of piezoelectric elements 12a, 12b and an external impedance element 14. The piezoelectric elements 12a, 12b are located between the metal blocks 11a, 11b and hold an electrode plate 13. The external impedance element 14 is connected between the electrode plate 13 and the piezoelectric element 12a. The external impedance element 14 changes the impedance of the electric circuit that includes the piezoelectric elements 12a, 12b and the electrode plate 13.

Langevin transducers are employed as the second transducers 6, which convert energy. As show in FIG. 2(b), each second transducer 6 includes annular upper and lower piezoelectric elements 15a, 15b, an annular electrode plate 16, which is arranged between the piezoelectric elements 15a, 15b. Like the first transducers 5, each second transducer 6 includes an adjuster 10. The adjuster 10 is located between the metal blocks 11a and 11b. The piezoelectric elements 15a, 15b are located between the metal blocks 11b and 11c. The adjuster 10 and the piezoelectric elements 15a, 15b are fastened to each other by a bolt (not shown) to form each second transducer 6. Each of the piezoelectric elements 15a, 15b is connected to a load circuit 17. Each load circuit 17 includes a resistor R and a coil L and functions as an energy converter.

The operation of the apparatus 1 will now be described.

The alternating-current power supply 9 supplies a current of a predetermined frequency (e.g., approximately 20 kHz) to the magnetostrictive elements 7. The first transducers 5 are excited. Then, the first horns 4a are vertically vibrated. This causes flexural vibrations of the vibrators 2a, 2b. The flexural vibration of each vibrator 2a, 2b generates air pressure. The air pressure levitates an object 3 from the surface of the vibrators 2a, 2b. The levitated distance of the object 3 is between several tens micrometers to several hundreds of micrometers.

The vibrations of each vibrator 2a, 2b are transmitted to the second transducers 6 connected to the associated load circuits 17. Then, the energy of the vibrations is converted into electrical energy by the piezoelectric elements 15a, 15b. The electrical energy is converted into Joule heat by the resistors R of the load circuits 17 and released. Consequently, waves of the vibrations generated in the vibrators 2a, 2b are turned into traveling waves, which travel in one direction (the direction from the first horns 4a to the second horns 4b in this embodiment). As a result, the object 3 is transported in a levitated state from one end of the vibrators 2a, 2b to the other end. The transportation of the object 3 is stopped by stopping the current from the power supply 9 to the transducers 5.

The transporting apparatus 1 transports the object 3 by traveling waves generated by the vibrators 2a, 2b. Therefore, if the phases and the amplitudes of the traveling waves generated by the vibrators 2a, 2b do not match, the object 3 cannot be stably transported. In this embodiment, the common power supply 9 is used, which equalizes the phases.

A transducer that uses piezoelectric elements must be excited at the resonance frequency for vibrating a coupled vibrator strongly, or at great amplitude. Since each first transducer 5 includes super-magnetostrictive material, the vibration increases substantially in accordance with the value of the supplied current. Thus, even if the resonance frequencies of the vibration devices are not the same, supplying a relatively great current to the magnetostrictive elements 7 from the common alternating-current power supply 9 vibrates the vibrators 2a, 2b at a required amplitude.

If the resonance frequencies of the vibration devices are the same, sending a current having the resonance frequency to the magnetostrictive elements 7 permits a required excitation to be generated by small electricity. Therefore, when assembling the transporting apparatus 1 or prior to the use of the transporting apparatus 1, the impedance of the electric circuit, which includes the piezoelectric elements 12a, 12b, is adjusted such that the impedance of the vibration devices are equalized. As a result, the resonance frequencies of the vibration devices are equalized.

Figure 2B:
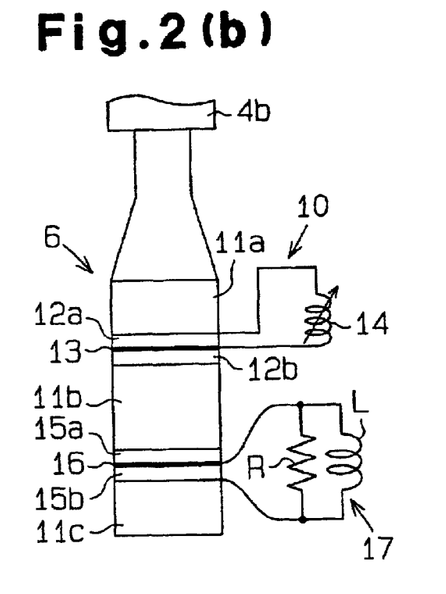
FIG. 2(b) is a front view illustrating a second transducer of the apparatus shown in FIG. 1.

The embodiment of FIGS. 1 to 2(b) has the following advantages.

Each first transducer 5 includes the magnetostrictive element 7, which has super-magnetostrictive material. The common power supply 9 is connected to both first transducers 5. The resonance frequencies of the vibration devices may be different due to errors produced when machining and assembling the parts. However, unlike transducers in which the magnetostrictive elements 7 are replaced by piezoelectric elements, the vibrators 2a, 2b are vibrated substantially at the same amplitude so that the object 3 is stably levitated.

The impedance is adjusted by the adjusters 10 to equalize the resonance frequencies of the vibration devices. The object 3 is therefore stably levitated.

The object 3 is levitated and transported by vibration of the vibrators 2a, 2b. Therefore, the structure for transporting the object 3 in a levitated state is simplified.

Each of the transducers 5, 6 has the adjuster 10. Therefore, the resonance frequencies of the vibration devices are easily equalized.

Each adjuster 10 includes the piezoelectric elements 12a, 12b and the external impedance element 14. Therefore, compared to a structure in which a weight selected from different weights is threaded to each of the transducers 5, 6 to adjust the resonance frequency, the resonance frequency is easily adjusted.

A second embodiment of the present invention will now be described with reference to FIGS. 3 and 4. The second embodiment is different from the first embodiment in that an object is levitated at a predetermined position by a plurality of vibrators that generate standing waves and in that the vibrators are excited by transducers having piezoelectric elements. To avoid redundancy, like or same reference numerals are given to those components that are the same as the corresponding components of the first embodiment.

Figure 3:
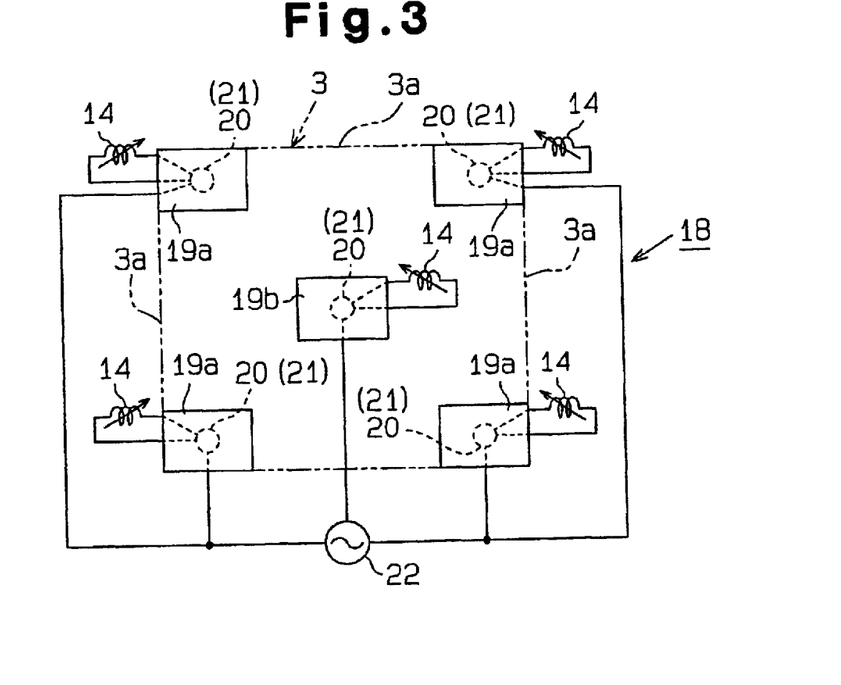
FIG. 3 is a plan view illustrating a transporting apparatus according to a second embodiment of the present invention.

As shown in FIG. 3, a transporting apparatus 18 includes four rectangular outer vibrators 19a and a rectangular center vibrator 19b. The size of the vibrators 19a, 19b are the same. The outer vibrators 19a corresponds to the corners of an object 3, which is shown by broken line. The outer vibrators 19a are equally spaced from the center vibrator 19b. A horn 20, which forms vibration device, is fixed to each of the vibrators 19a, 19b by a screw. Each horn 20 is substantially cylindrical and attached to the substantial center of the corresponding one of the vibrators 19a, 19b.

Figure 4:
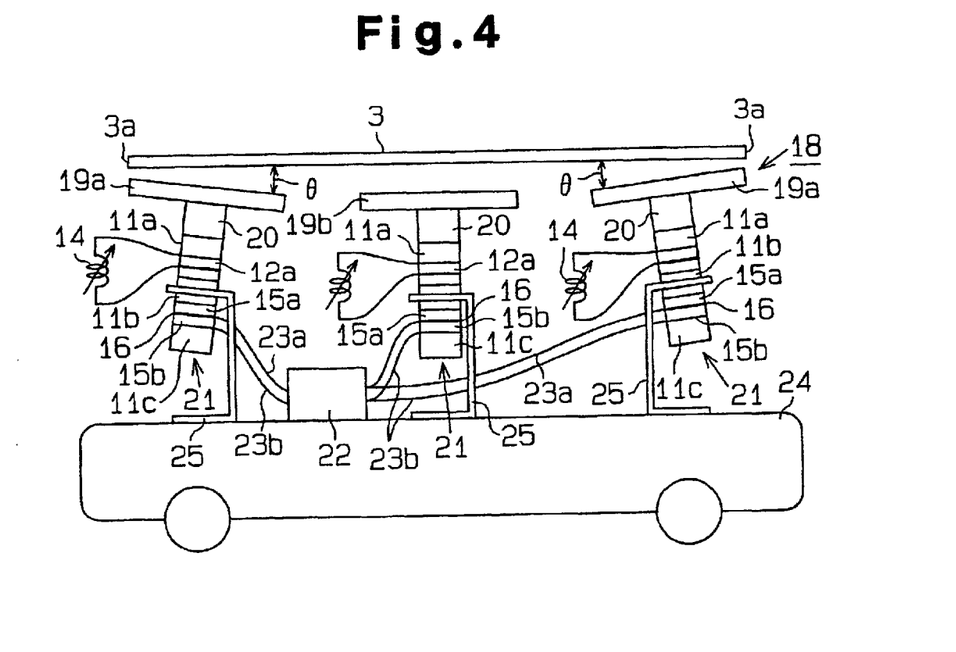
FIG. 4 is a front view illustrating the apparatus of FIG. 3 when mounted on a carriage.

As shown in FIG. 4, each horn 20 is fixed to a Langevin transducer 21 at the side opposite from the corresponding vibrator 19a, 19b. The distal surface of each horn 20 is formed perpendicular to the axis of the corresponding transducer 21. The axis of each horn 20 is aligned with the axis of the corresponding transducer 21.

Each transducer 21 includes a pair of annular piezoelectric elements 15a, 15b and an annular electrode plate 16. The electrode plate 16 is located between the piezoelectric elements 15a, 15b. The transducers 21 are connected to a common oscillator 22, which functions as a power supply. Each electrode plate 16 is connected to the oscillator 22 through a first wire 23a. The oscillator 22 has a ground terminal connected to the metal blocks 11c through a second wire 23b. The horns 20, the transducers 21, the oscillator 22 form the vibration device for exciting the vibrators 19a, 19b.

The transporting apparatus 18 is mounted on a carriage 24 through brackets 25. Each outer vibrator 19a is inclined at an angle θ relative to the object 3. The center vibrator 19b is parallel to the object 3. Each transducer 21 is fixed to the corresponding bracket 25.

The transporting apparatus 18 levitates the plate like object 3 and is moved to a certain destination by the carriage 24. As shown in FIG. 3, the object 3 is put on the vibrators 19a, 19b such that the edges 3a of the object 3 are aligned with the edges of the outer vibrators 19a. In this state, the oscillator 22 vibrates the transducers 21 at a predetermined resonance frequency (e.g., approximately 20 kHz), which generates standing waves from the vibrators 19a, 19b. Accordingly, the object 3 is levitated at a predetermined position.

In addition to the advantages of the embodiment of FIGS. 1 to 2(b), the embodiment of FIGS. 3 and 4 has the following advantages.

Each vibration device includes an adjuster 10. The adjusters 10 are used for adjusting the resonance frequencies of the vibration devices. Therefore, even if the sizes and arrangement of the vibration devices are not the same due to errors produced during manufacturing and assembling, the resonance frequencies of the vibration devices are adjusted to be equal. The vibration devices are excited by the common oscillator 22. Thus, the vibrators 19a, 19b are vibrated at substantially the same amplitude so that the object 3 is stably levitated.

The vibrators 19a, 19b are vibrated to generate standing waves. Therefore, compared to an apparatus that produces traveling waves, the apparatus 18 has a simple structure.

The transporting apparatus 18 is located on the carriage 24. Therefore, a passage through which the levitated object 3 is transported can be freely selected.

The outer vibrators 19a are inclined at the angle θ to the horizontal plane. This allows the object 3 to be held more reliably in the predetermined position, as compared to an apparatus in which vibrators are horizontal.

The bottom surface of the object 3 is flat, and the edges 3a of the object 3 are straight. When the outer vibrators 19a levitate the object 3, the outer edges 3a of the outer vibrators 19a are vertically aligned with the corresponding edges 3a of the object 3. This enables the object 3 to be stabilized in the predetermined position.

Figure 5:
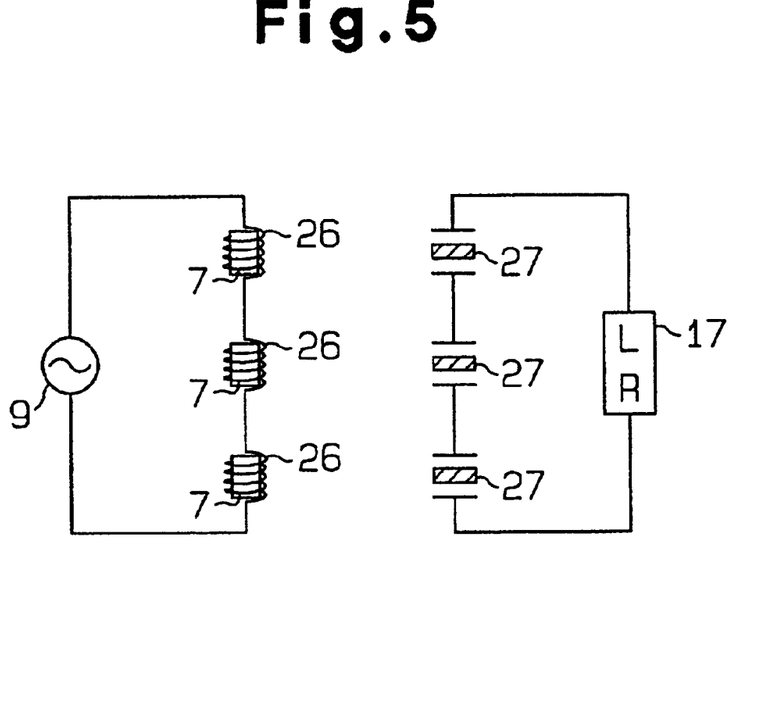
FIG. 5 is a circuit diagram showing a transducer according to a third embodiment.
Figure 6:
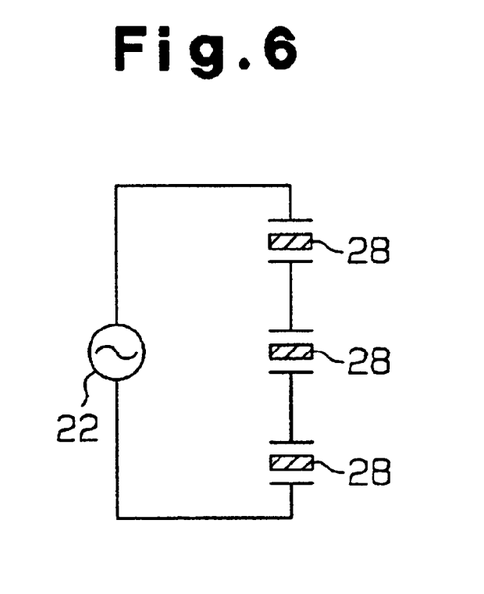
FIG. 6 is a circuit diagram showing a transducer according to a fourth embodiment.

In the embodiments of FIGS. 1 to 4, the transducers 5, 21 are connected to a common power source in parallel. However, the transducers 5, 21 may be connected in series. In a third embodiment shown in FIG. 5, the magnetostrictive elements 7 of the embodiment of FIGS. 1 to 2(b) are connected to the alternating-current power supply 9 in series. Also, the piezoelectric elements 27 (the piezoelectric elements 12a, 12b) of the energy converting transducers 6 are connected to a common load circuit 17. In the embodiment of FIG. 5, the numbers of the transducers 5, 6 are three each. FIG. 6 shows a fourth embodiment. In the fourth embodiment, piezoelectric elements 28, which correspond to the piezoelectric elements 15a, 15b in FIG. 2(b), are connected to the oscillator 22 in series.

A transporting apparatus 101 according to a fifth embodiment of the present invention will now be described with reference to FIGS. 7 to 8(b). Mainly, the differences from the embodiment of FIGS. 1 to 2(b) will be discussed below.

Figure 7:
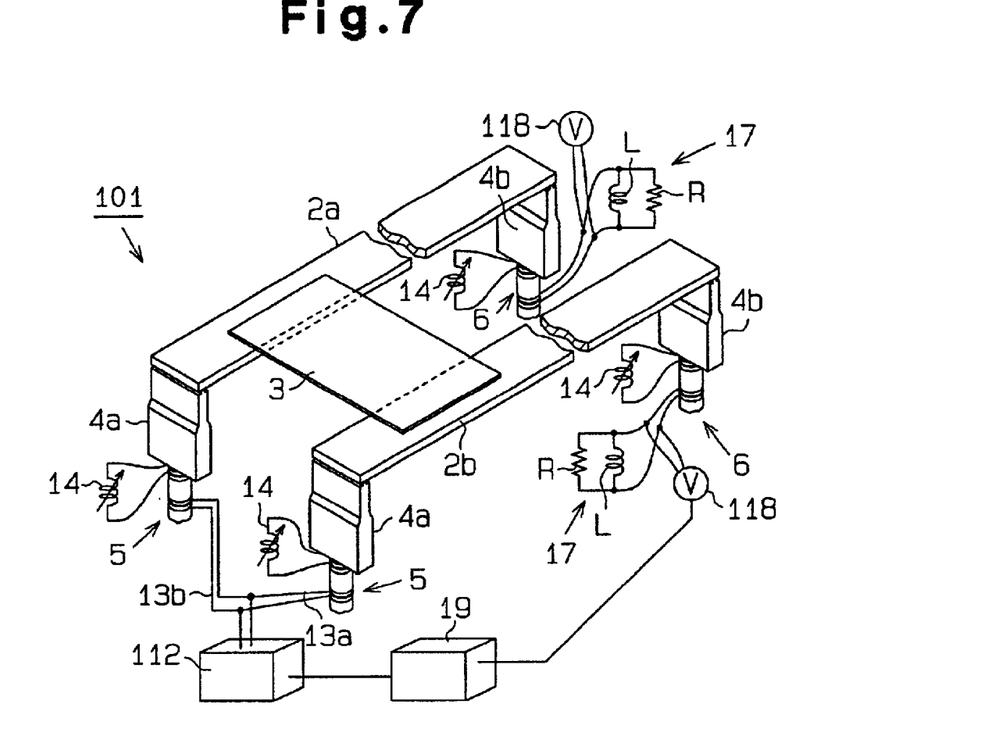
FIG. 7 is a perspective view illustrating a transporting apparatus according to a fifth embodiment of the present invention.
Figure 8A:
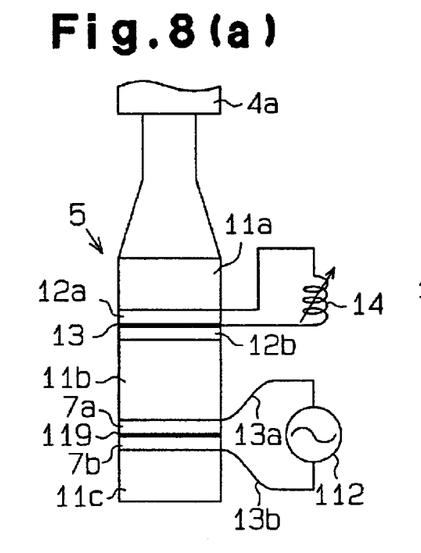
FIG. 8(a) is a front view illustrating a first transducer of the apparatus shown in FIG. 7.
Figure 8B:
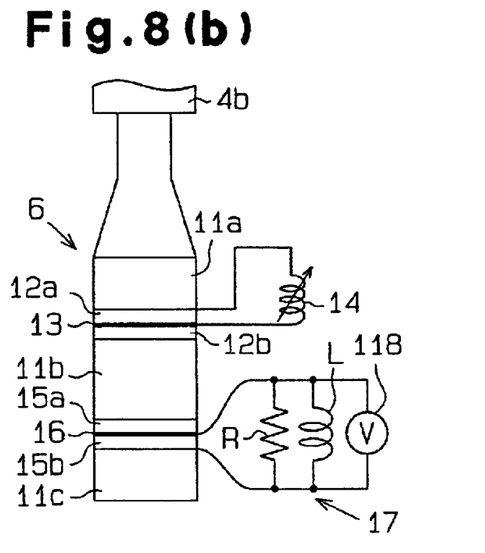
FIG. 8(b) is a front view illustrating a second transducer of the apparatus shown in FIG. 7.

As shown in FIGS. 7 to 8(b), each first transducer 5 includes piezoelectric elements 7a, 7b, and an electrode plate 119, which are located between the metal blocks 11b, 11c. The three metal blocks 11a, 11b, 11c are fastened to one another by a bolt (not shown). The bolt extends through the metal blocks 11c and 11b and is screwed to a threaded hole formed in the metal block 11a. The metal blocks 11a, 11b, 11c are electrically conducted by the bolt.

The piezoelectric elements 7a, 7b are connected to a common oscillator 112. The electrode plate 119 is connected to the oscillator 112 through a first wire 13a. The oscillator 112 has a ground terminal connected to the metal blocks 11c through a second wire 13b.

Each second transducer 6 includes a voltage sensor 118, which detects the voltage generated by the piezoelectric elements 15a, 15b. In this embodiment, each voltage sensor 118 functions as a detector that detects the vibration state of the corresponding second transducer 6.

The oscillator 112 is activated by a signal from a controller 19. The controller 19 includes a central processing unit (not shown). The voltage sensor 118 that is connected to the vibrator 2b is connected to the CPU of the controller 19 through an A/D converter and an interface (neither is shown). The controller 19 controls the output of the oscillator 112 based on the signal detected by the connected voltage sensor 118 such that the voltages of the piezoelectric elements 15a, 15b are equal to or greater than a predetermined level. In this embodiment, the controller 19 chiefly controls the output frequency of the oscillator 112.

The controller 19 has a memory (not shown), which stores a map or a formula that represents the relationship of the resonance frequency of the vibration device at a reference temperature, the difference between the ambient temperature of the vibration device from the reference temperature, and the deviation of the actual resonance frequency of the vibration device from the resonance frequency at the reference temperature. The controller 19 adjusts the output frequency of the oscillator 112 in accordance with temperature changes. If the voltages detected by the voltage sensors 118 drop when there is no temperature change, the controller 19 controls the oscillator 112 to increase the voltage.

The apparatus 101 has the following advantages.

The transporting apparatus 101 transports the object 3 by traveling waves generated by the vibrators 2a, 2b. Therefore, if the phases and the amplitudes of the traveling waves generated by the vibrators 2a, 2b do not match, the object 3 cannot be stably transported.

A transducer that uses piezoelectric elements must be excited at the resonance frequency for vibrating a coupled vibrator strongly, or at great amplitude. Since the first transducers 5 are connected to the common oscillator 112, the phases and the amplitudes of the vibrators 2a, 2b match if the vibration devices having the vibrators 2a, 2b have the same resonance frequencies.

Due to errors produced when machining and assembling, it is difficult to match the resonance frequency of the vibration devices. However, the first and second transducers 5, 6 of the embodiment of FIGS. 7 to 8(b) are each connected to the corresponding external impedance element 14 the impedance of which can be changed. In other words, the external impedance element 14 of each vibration device can be independently adjusted. This permits the resonance frequencies of the vibration devices to be equalized.

Prior to operating the transporting apparatus 101, the external impedance elements 14 are adjusted. The first transducer 5 of each vibration device is excited at a predetermined frequency (the resonance frequency), and the external impedance element 14 is adjusted such that the voltage generated by the voltage sensor 118 is maximized. Thereafter, the transporting apparatus 101 is operated.

The oscillator 112 is activated by a signal from the controller 19, which excites the first transducers 5 at a predetermined resonance frequency (e.g., approximately 20 kHz). Then, the first horns 4a are vertically vibrated. This torsionally vibrates the vibrators 2a, 2b. The torsional vibration of each vibrator 2a, 2b generates air pressure. The air pressure levitates an object 3 from the surface of the vibrators 2a, 2b. The levitated distance of the object 3 is between several tens micrometers to several hundreds of micrometers.

The vibrations of each vibrator 2a, 2b are transmitted to the second transducers 6 connected to the associated load circuits 17. Then, the energy of the vibrations is converted into electrical energy by the piezoelectric elements 15a, 15b. The electrical energy is converted into Joule heat by the resistors R of the load circuits 17 and released. Consequently, waves of the vibrations generated in the vibrators 2a, 2b are turned into traveling waves, which travel in one direction (the direction from the first transducers 5 to the second transducers 6 in this embodiment). As a result, the object 3 is transported in a levitated state from one end of the vibrators 2a, 2b to the other end. The conveyance of the object 3 is stopped by deactivating the oscillator 12.

The controller 19 controls the oscillator 112 such that the voltages of the voltage sensors 118 are equal to or higher than a predetermined level. Specifically, when the voltage of each voltage sensor 118 is lower than the predetermined value, the controller 19 judges whether the ambient temperature of the corresponding vibration device is displaced from the reference temperature. If the ambient temperature is different from the reference temperature, the current resonance frequency is displaced from the resonance frequency at the reference temperature. The controller 19 controls the frequency of the oscillator 112 to eliminate the deviation of the current resonance frequency from the resonance frequency at the reference temperature. When judging that the voltage of each voltage sensor 118 is lowered by a cause other than the deviation of the resonance frequency due to the temperature change, the controller 19 raises the voltage of the oscillator 112. As a result, the object 3 is levitated and transported in a stable manner.

The embodiment of FIGS. 7 to 8(b) has the following advantages.

Each first transducer 5 has an adjuster, which includes the piezoelectric elements 7a, 7b, to which no voltage is supplied, and the external impedance element 14. Therefore, the impedance of the vibration devices, which include the vibrators 2a, 2b, can be adjusted by adjusting the corresponding external impedance element 14. This permits the resonance frequency of each vibration device to be altered. As a result, the vibration devices are vibrated at the same amplitude, which permits the object 3 to be levitated and transported in a stable manner.

Each voltage sensor 118 functions as detection means for detecting the vibration state of the corresponding second transducer 6 and detects the voltage of the energy converting element, or the corresponding piezoelectric elements 15a, 15b. Therefore, the vibration state of each second transducer 6 is easily detected.

The controller 19 controls the oscillator 112 based on the signals detected by the voltage sensors 118 such that the voltage generated by the piezoelectric elements 15a, 15b of the second transducers 6 is equal to or higher than the predetermined level. Therefore, when the resonance frequency of the vibration devices changes due to a temperature change or to presence or absence of the object 3, the vibrators 2a, 2b are excited at the amplitude required for transporting the object 3. As a result, the object 3 is levitated and transported in a stable manner.

When the resonance frequency of the vibration devices is changed due to a temperature change or to presence or absence of the object 3, the controller 19 changes the frequency of the oscillator 112 accordingly. Therefore, the vibrators 2a, 2b are reliably vibrated at a desired amplitude.

Each second transducer 6 has the external impedance element 14 for adjusting the impedance of the corresponding vibration device. Therefore, the resonance frequency of each vibration device is easily adjusted.

Each adjuster is formed by the piezoelectric elements 7a, 7b and the external impedance element 14. Therefore, compared to a structure in which a weight selected from different weights is threaded to each of the transducers 5, 6 to adjust the resonance frequency, the resonance frequency is easily adjusted.

Figure 9:
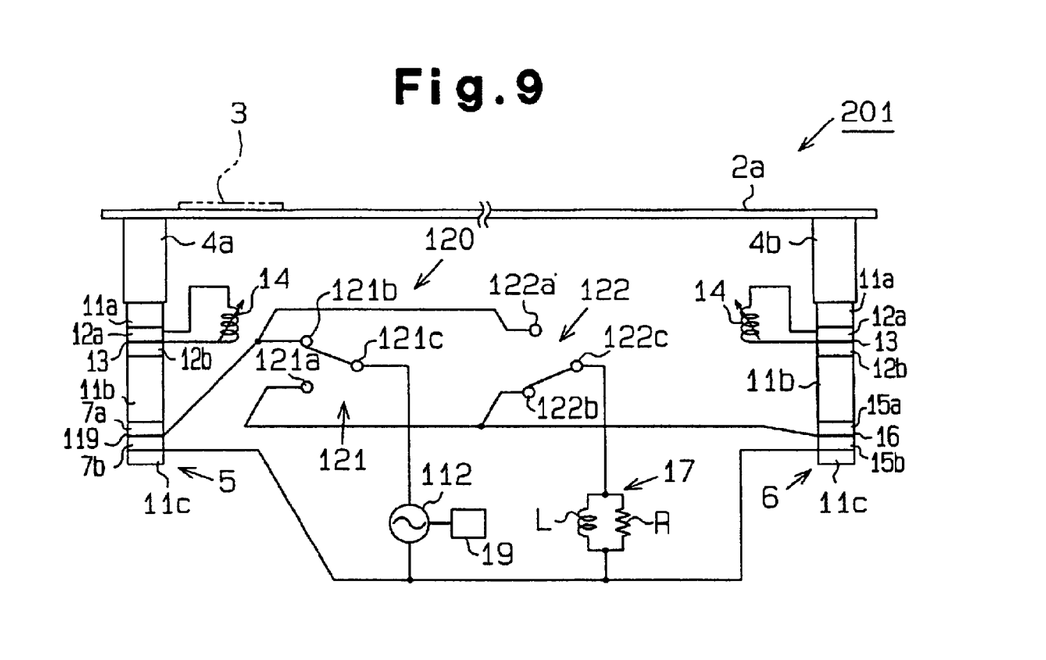
FIG. 9 is a front view illustrating a transporting apparatus according to a sixth embodiment of the present invention.

A transporting apparatus 201 according to a sixth embodiment of the present invention will now described with reference to FIG. 9. The embodiment of FIG. 9 is different from the embodiment of FIGS. 7 to 8(b) in that there is one vibrator and the direction of the traveling wave can be changed. To avoid redundancy, like or same reference numerals are given to those components that are the same as the corresponding components of the embodiment of FIGS. 7 to 8(b).

The piezoelectric elements 7a, 7b of the first transducer 5 and the piezoelectric elements 15a, 15b of the second transducer 6 are selectively connected to the oscillator 112 and to the load circuit 17 by switching means 120.

The switching means 120 includes an electromagnetic relay. An electrode plate 119 and an electrode plate 16 are connected to the plus terminal of the oscillator 112 and the load circuit 17 through a first change-over contact 121 and a second change-over contact 122 of the relay. The plus terminal of the oscillator 112 is connected to a common terminal 121c of the first change-over contact 121. The electrode plate 16 is connected to a normally open terminal 121a of the first change-over contact 121. The electrode plate 119 is connected to a normally closed terminal 121b of the first change-over contact 121. A terminal of the load circuit 17 is connected to a common terminal 122c of the second change-over contact 122. The electrode plate 119 is connected to a normally open terminal 122a of the second change-over contact 122. The electrode plate 16 is connected to a normally closed terminal 122b of the second change-over contact 122. The oscillator 112 has a ground terminal, which is connected to another terminal of the load circuit 17. The ground terminal of the oscillator 112 is also connected to the metal blocks 11c of the transducers 5, 6. Each transducer 5, 6 has piezoelectric elements 7a, 7b and an external impedance element 14. The change-over contacts 121, 122 are switched such that the contact states of the contacts 121, 122 are always different.

When an object 3 is in the vicinity of the stop position of the vibrator 2a, or above the second transducer 6. A sensor (not shown) detects the position of the object 3 and sends a signal to the controller 19.

In the embodiment of FIG. 9, the piezoelectric elements 7a, 7b of the first transducer 5 are normally connected to the oscillator 112 through the first change-over contact 121, and the piezoelectric elements 15a, 15b of the second transducer 6 are normally connected to the load circuit 17 through the second change-over contact 122. When the oscillator 112 is activated, the object 3 is levitated and transported from the side of the first transducer 5 to the side of the second transducer 6 by traveling waves generated by the vibrator 2a.

When detecting that the object 3 is at the stop position of the vibrator 2a, the controller 19 activates the switching means 120 such that the contact state of the first and second change-over contacts 121, 122 is opposite from that shown in FIG. 9. As a result, the piezoelectric elements 15a, 15b of the second transducer 6 are connected to the oscillator 112, and the piezoelectric elements 7a, 7b of the first transducer 5 are connected to the load circuit 17. Thus, the traveling waves progress from the side of the second transducer 6 to the side of the first transducer 5. This decelerates the levitated object 3.

If the oscillator 112 is stopped when the object 3 is at the predetermined stop position, the object 3 is stopped and falls on the vibrator 2a. If the switching means 120 alternately switches the contact state of the first and second change-over contacts 121, 122 at short intervals when the object 3 is at the stop position, the object 3 remains at the position while being levitated.

The impedance of the vibration device is adjusted by adjusting the external impedance element 14 in the same manner as the embodiment of FIGS. 7 to 8(b). The controller 19 changes the output of the oscillator 12 such that the voltage of a voltage sensor (not shown) is equal to or higher than a predetermined level.

In addition to the advantages of the embodiment shown in FIGS. 7 to 8(b), the embodiment of FIG. 9 has the following advantages.

The first and second transducers 5, 6 are selectively connected to the load circuit 17 and the oscillator 112 through the switching means 120. Therefore, when the object 3 approaches the stop position of the vibrator 2a, the object 3 is reliably decelerated by changing the direction of the traveling waves and does not fall. Also, the object 3 can be held at a desired position while being levitated by repeating switching of the switching means 120 at short intervals.

Figure 10:
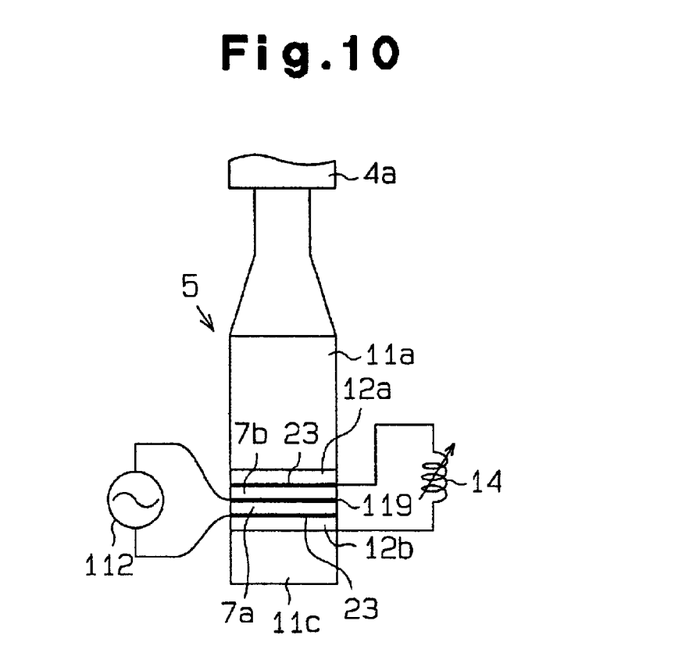
FIG. 10 is a front view illustrating a first transducer according to a seventh embodiment.

FIG. 10 shows a seventh embodiment of the present invention. In this embodiment, exciting piezoelectric elements 7a, 7b, an electrode plate 119, piezoelectric elements 12a, 12b for adjusting the resonance frequency, and an electrode plate 23 are located between metal blocks 11a, 11c. The embodiment of FIG. 10 is simple compared to the transducer 5 shown in FIG. 2(a). The piezoelectric elements 15a, 15b, 12a, 12b of the second transducer 6 may be constructed in the same manner as in FIG. 10.

It should be apparent to those skilled in the art that the present invention may be embodied in many other specific forms without departing from the spirit or scope of the invention. Particularly, it should be understood that the invention may be embodied in the following forms.

In the embodiments of FIGS. 1 to 2(b) and FIGS. 7 to 8(b), at least three of the first transducers 5 may be used. In this case, all of the first transducers 5 may be connected to a common power supply 9. Alternatively, a plurality of power supplies 9 may be used. In this case, at least one of the power supplies 9 is connected to at least two of the first transducers 5. In addition, in the embodiment of FIGS. 3 and 4, a plurality of oscillators 22 may be used. In this case, at least one of the oscillators 22 is connected to at least two of the first transducers 21.

If the object 3 need be transported for a long distance in the transporting apparatus 1 shown in FIG. 1, several sets of the vibrators 2a, 2b may be consecutively arranged along the transporting direction. In this case, the transducers 5 may be connected to a common alternating-current power supply. Also, if the object 3 is wide in the lateral direction, three or more vibrators 2a, 2b may be arranged in parallel.

In the embodiment of FIGS. 1 to 2(b), the adjusters 10 may be omitted.

In the transporting apparatus 1 of FIG. 1, the adjusters 10 may be omitted from at least one of the vibration devices. This reduces the number of the adjusters 10 and lowers the cost.

In the transporting apparatus 1 of FIGS. 1 to 2(b), the adjusters 10 may be omitted from one of the first and second transducers 5, 6. This reduces the cost.

In the transporting apparatus 1 FIG. 1, the magnetostrictive elements 7 may be replaced by the transducers 21 shown in FIGS. 3 and 4. In the transporting apparatus 18, which produces standing waves, the transducers 21 may be replaced by the magnetostrictive elements 7 shown in FIGS. 1 and 2(a).

The vibrators 2a, 2b shown in FIG. 1 may produce standing waves, and the apparatus 1 may have a device to blast air against the levitated object 3 to transport the object 3.

Instead of mounting the transporting apparatus 18 shown in FIGS. 3 and 4 on the carriage 24, the apparatus 18 may be mounted on and moved by a belt conveyor.

The horns 20 need not be cylindrical, but may be shaped as flattened rectangular parallelepipeds. Alternatively, the horns 20 may have a conical shape with its diameter increased at lower locations.

To levitate the square object 3, the locations of the vibrators 19a do not necessarily have to be located at positions corresponding to the four corners of the object 3 and, for example, the vibrators 19a may be located at positions corresponding to the middles of the associated sides of the object 3. Further, the number of the vibrators 19a, 19b is not limited to five and may be varied as required. For example, the center vibrator 19b may be eliminated so that the total number of the transporting vibrators is four. Alternatively, the number of the vibrators may be changed in accordance with the size of the object 3.

The object 3 does not have to be square and may have other polygonal shapes or round shapes.

The present invention may be used for an object 3 having such a dimension that its edges 3a are situated on imaginary lines extending from the corresponding outer edges of the vibrators 19a.

Instead of using bolts to fasten the vibrators 2a, 2b, 19a, 19b to the associated horns 4a, 4b, 20 the vibrators 2a, 2b, 19a, 19b may be adhered, brazed, or welded to the associated horns 4a, 4b, 20.

The transporting apparatus 101, 201 shown in FIGS. 7 and 9 may include a sensor for judging the presence of an object, and the output voltage of the oscillator 112 may be varied in accordance with the presence and absence of the object. Alternatively, the output voltage of the oscillator 112 may be varied in accordance with the weight of the object. For example, an appropriate relationship between the weight of a transported object and the output voltage may be stored in the controller 19, and the oscillator 12 may be controlled to output a voltage of an appropriate level, which is determined according to the weight of a carried object (the object 3). Since the weight of the object is detected, the output voltage of the oscillator 112 is easily controlled. In this case, when the voltage detected by the voltage sensor 118 is lower than a predetermined level, the output frequency of the oscillator 112 is changed.

The vibration state of the first transducer 5 may be detected by a current sensor or a voltage sensor based on the output current of the piezoelectric elements 15a, 15b. Alternatively, the vibration state of the first transducer 5 may be detected by a phase comparator based on whether the vibration phase of the second transducer 6 is deviated from that of the first transducer 5.

The impedance of each external impedance element 14 may be changed such that the output voltage or the output current of the energy converting elements (the piezoelectric elements 15a, 15b) is equal to or higher than a predetermined level. In this case, the iron core of each external impedance element 14 is automatically moved, for example, by an electric cylinder or a linear actuator based on commands from the controller 19. The output of the oscillator 112 and the level of each external impedance element 14 may both be adjustable.

Each external impedance element 14 may be included in a bridge circuit, and the external impedance element 14 may be controlled such that output of the bridge circuit is constant.

The external impedance elements 14 may include structure other than coils. For example, each external impedance element 14 may include a coil and a condenser or a condenser and a resistor. In this case, the capacity of each condenser is changed for adjusting the impedance.

The external impedance elements 14 may be periodically adjusted.

In the embodiments of FIGS. 7 and 9, the piezoelectric elements 7a, 7b and the external impedance elements 14 of the second transducers 6 may be omitted. This reduces the number of parts in the adjuster and lowers the cost.

The horns 4a, 4b need not be flattened rectangular parallelepipeds, but may be cylindrical. Alternatively, the horns 4a, 4b may have a conical shape with its diameter increased at lower locations.

Therefore, the present examples and embodiments are to be considered as illustrative and not restrictive and the invention is not to be limited to the details given herein, but may be modified within the scope and equivalence of the appended claims.

What is claimed is:

1. An apparatus for levitating and transporting an object, wherein the apparatus levitates the object above the surfaces of a plurality of vibrators by air pressure of sound waves that are generated by the vibrators, the apparatus comprising:

a plurality of vibration devices, each of which corresponds to one of the vibrators, wherein each vibration device includes a first transducer for vibrating the corresponding vibrator, each first transducer including a super-magnetostrictive material, wherein each first transducer is coupled to one end of the corresponding vibrator, wherein each vibration device further includes a second transducer, each of which is coupled to the other end of one of the vibrators, wherein each second transducer includes a piezoelectric element, which converts mechanical energy into electrical energy, wherein each of the first and second transducers includes an adjuster for adjusting the impedance of the vibration device, wherein the adjuster includes:

a piezoelectric element, which converts mechanical energy into electrical energy; and an external impedance element, the impedance of which is variable; and a common power source, which is connected to more than two first transducers for actuating the first transducers simultaneously.

2. The apparatus according to claim 1, wherein each first transducer produces standing waves in the corresponding vibrator.

3. The apparatus according to claim 1, wherein each vibrator is formed as an elongated plate, wherein the vibrators are parallel, and wherein each first transducer produces traveling waves in the corresponding vibrator for moving an object in the longitudinal direction of the vibrators.

4. The apparatus according to claim 1, wherein the second transducers are coupled to energy converting means for attenuating the vibration of the second transducers.

5. The apparatus according to claim 1, wherein the common power source is connected to all the first transducers.

6. An apparatus for levitating and transporting an object, wherein the apparatus levitates an object above the surfaces of a plurality of vibrators by air pressure of sound waves that are generated by the vibrators, the apparatus comprising:

a plurality of vibration devices, each of which corresponds to one of the vibrators, wherein each vibration device includes a first transducer for vibrating the corresponding vibrator, each first transducer including a piezoelectric element, wherein each first transducer is coupled to one end of the corresponding vibrator, wherein each vibration device further includes a second transducer, each of which is coupled to the other end of one of the vibrators, wherein each second transducer includes a piezoelectric element, which converts mechanical energy into electric energy, wherein each of the first and second transducers includes an adjuster for adjusting the impedance of the vibration device, wherein the adjuster includes:

a piezoelectric element, which converts mechanical energy into electric energy; and an external impedance element, the impedance of which is variable; and a common power source, which is connected to more than two first transducers for actuating the first transducers simultaneously.

7. The apparatus according to claim 6, wherein each first transducer produces standing waves in the corresponding vibrator.

8. The apparatus according to claim 6, wherein each vibrator is formed as an elongated plate, wherein the vibrators are parallel, and wherein each first transducer produces traveling waves in the corresponding vibrator for moving an object in the longitudinal direction of the vibrators.

9. The apparatus according to claim 8, wherein the second transducers are coupled to energy converting means for attenuating the vibration of the second transducers.

10. The apparatus according to claim 6, wherein the common power source is connected to all the first transducers.

11. An apparatus for levitating and transporting an object, wherein the apparatus levitates an object above the surface of an elongated vibrator by air pressure of sound waves that are generated by the vibrator, and wherein the vibrator produces traveling waves, the apparatus comprising:

a first transducer coupled to one end of the vibrator, the first transducer including:

a piezoelectric element, which converts mechanical energy into electric energy; and a transducer for vibrating the vibrator;

a second transducer coupled to the other end of the vibrator, the second transducer including a changing element, which changes output voltage or output current for converting mechanical energy into electric energy;

an external impedance element connected to the piezoelectric element, wherein the impedance of the external impedance element is variable;

an oscillator, which is connected to the first transducer for vibrating the first transducer;

a detector for detecting the vibration state of the second transducer; and a controller, which controls a least one of the oscillator and the external impedance element based on the vibration state of the second transducer detected by the detector such that the output voltage or the output current of the changing element is greater than a predetermined value.

12. The apparatus according to claim 11, further comprising a vibration device, which includes the vibrator, the first transducer, and the second transducer all joined as a unit, wherein the external impedance element is one of a plurality of external impedance elements, a second external impedance element being located in the second transducer for adjusting the impedance of the vibration device.

13. The apparatus according to claim 11, further comprising a load circuit, which converts mechanical energy into electric energy, and wherein the first and second transducers are selectively connected to the load circuit and the oscillator.

14. The apparatus according to claim 13, further including a switching device for switching the connecting state of the load circuit, the oscillator and the first and second transducers, wherein the switching device selectively changes the direction of the traveling waves that are produced by the vibrator.

* * * * *

UNITED STATES PATENT AND TRADEMARK OFFICE
CERTIFICATE OF CORRECTION

PATENT NO. : 6,802,220 B2
DATED : October 12, 2004
INVENTOR(S) : Takasan et al.

It is certified that error appears in the above-identified patent and that said Letters Patent is hereby corrected as shown below:

Column 6,
Line 49, please delete "angle 0" and insert therefor -- angle-$\theta$ --;

Column 7,
Line 15, please delete "11c and lib and is" and insert therefor -- 11c and 11b and is --;

Column 14,
Line 34, please delete "controls a least" and insert therefor -- controls at least --.

Signed and Sealed this

Fifteenth Day of February, 2005

JON W. DUDAS
*Director of the United States Patent and Trademark Office*